March 7, 1944.  C. J. CRANE  2,343,281
STALL, SKID, AND SLIP WARNING DEVICE FOR AIRCRAFT
Filed Feb. 26, 1942
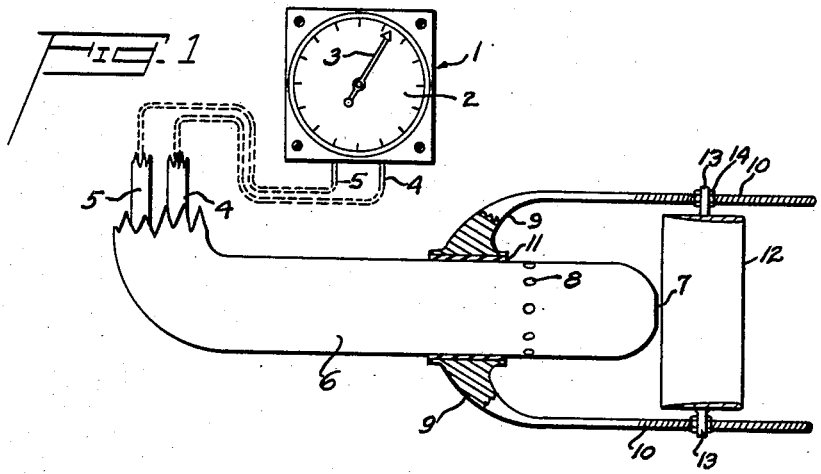
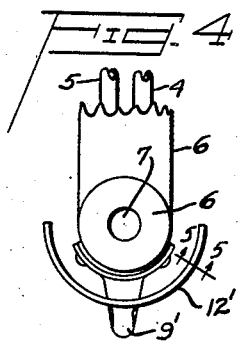
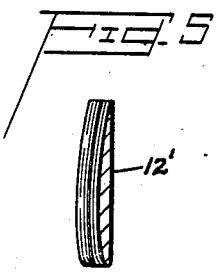
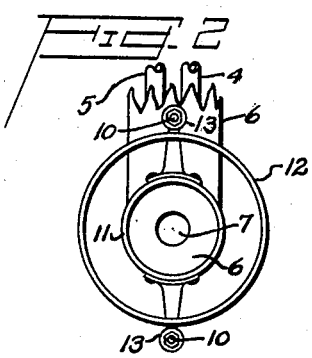
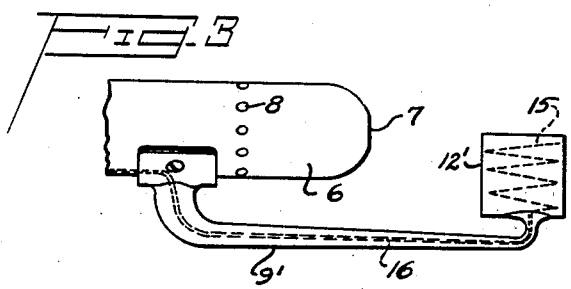
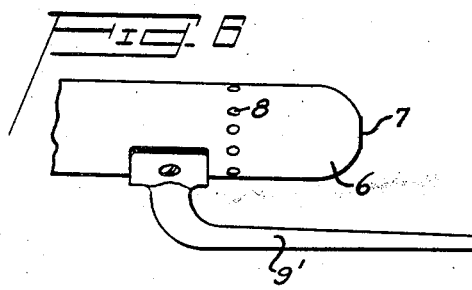
INVENTOR
CARL J. CRANE
BY
ATTORNEYS Patented Mar. 7, 1944

2,343,281

UNITED STATES PATENT OFFICE 2,343,281

STALL, SKID, AND SLIP WARNING DEVICE FOR AIRCRAFT

Carl J. Crane, Phoenix, Ariz.

Application February 26, 1942, Serial No. 432,460

7 Claims. (Cl. 73—152)

(Granted under the act of March 3, 1883, as amended April 30, 1928; 370 O. G. 757)

The invention described herein may be manufactured and used by or for Government for governmental purposes, without the payment to me of any royalty thereon.

This invention relates to a warning device for aircraft whereby the pilot may be warned of a stall, slip, or skid, the warning being indicated on the conventional air-speed indicator regularly installed on the airplane.

Stall warning devices are old in the art, and the prior devices have been separate items of equipment, while, in accordance with the invention, by means of a simple accessory attached to the Pitot-static head of an air-speed indicator, the indicator itself serves to give a warning indication. At all times when normal safe flying conditions prevail, the air-speed indicator serves its usual function of indicating air speed.

The invention is based on the fact that thin airfoil sections stall or burble very sharply at angles of attack less than the stalling angle of the airfoil sections in general use for aircraft wings or other sustaining surfaces. By providing an annular ring or partial ring having cross sections in the form of a thin airfoil section, and hereinafter called a spoiler ring, and mounting the same substantially concentric with the axis of the dynamic pressure opening of a Pitot-static air-speed indicator head and positioning the ring forward of the said opening, during flight at normal angles of attack and at air speeds beyond the stalling speed, the air flow through the spoiler ring will be smooth and will not affect the indication of the air-speed indicator, but as the angle of attack, or pitch, increases and approaches the stalling angle, the airfoil sections part of the spoiler ring will stall and create an unstable or burbling flow which will cause rapid changes in the dynamic pressure transmitted to the air-speed indicator, causing the pointer thereof to oscillate violently and indicating the approach of a stall of the aircraft supporting surfaces. Similarly, if the aircraft slips or skids with sufficient velocity so that the relative wind impinges transversely on the spoiler ring at an angle of yaw equal to the stalling angle of the airfoil section of the spoiler ring, the same will cause a burbling flow which will cause fluctuation of the air-speed indicator pointer to give a warning signal.

In place of an annular spoiler ring, a small streamline body of a considerable fineness ratio may be employed.

The principal object of the invention is the provision of a stall warning device comprising, in combination with an air-speed indicator of the differential-pressure-actuated type, a spoiler positioned with reference to the air-speed indicator pressure-measuring head so that at angles approaching a stall, dangerous slip, or skid, the spoiler will cause a burbling or turbulent air flow into the pressure-measuring head to cause pressure variations indicated by the air-speed indicator as a warning signal.

A further object of the invention is the provision, in combination with an air-speed indicator having a Pitot-static pressure-transmitting head and a differential-pressure-indicating means, of an air flow spoiler positioned relative to the dynamic pressure opening of the Pitot-static head such that when the axis of the dynamic pressure opening is inclined with respect to the relative wind beyond a predetermined angle, the spoiler will cause pressure fluctuations which will be manifested by oscillation of the pointer of the indicating means as a warning signal.

Other objects of the invention will appear by reference to the detailed description hereinafter given and to the appended drawing in which:

Fig. 1 is a schematic view, partly in section, illustrating one form of the invention;

Fig. 2 is a front elevation of the device of Fig. 1;

Fig. 3 is a side elevation showing a modified form of spoiler device from that illustrated in Fig. 1;

Fig. 4 is a front elevation of the device of Fig. 3;

Fig. 5 is a view taken on line 5—5 of Fig. 4; and

Fig. 6 is a side elevation of a modification of the device of Fig. 1 illustrating the use of a small streamline body as a spoiler.

Referring now to Fig. 1, the reference numeral I generally indicates the differential-pressure-responsive indicating unit of an air-speed indicator which is customarily mounted on the instrument board of an aircraft and having a dial 2 calibrated in terms of air speed, and the pressure-responsive elements of the indicator being adapted to actuate an indicating pointer 3 which indicates the instant value of the air speed of the associated aircraft. The indicator unit I is connected by means of conduits 4 and 5 to a Pitot-static head 6 of a conventional type, which is usually mounted on the aircraft wing some distance ahead of the leading edge thereof, and the Pitot-static head 6 being provided with the customary dynamic pressure opening 7 which is connected to the conduit 4, and a ring of static pressure openings 8 which communicate with the conduit 5, the indicator unit 1 measuring the difference between the dynamic pressure at opening 7 due to the velocity of the aircraft and the static pressure in the air stream transmitted through the openings 8.

The device so far described constitutes a conventional air-speed-indicating means long used in the art for its intended purpose, and in accordance with the invention as illustrated in Figs. 1 and 2 there is provided a pair of arms 9 arranged on the upper and lower sides of the Pitot-static head 6, which arms extend generally in a direction parallel with the longitudinal axis of the Pitot-static head 6 and adjacent their outer ends form small supporting rods threaded as indicated by the reference numeral 10. The arms 9 are preferably secured by rivets or the like at their inner ends to a ring 11 which is pressed on to the body of the Pitot-static head 6. An annular ring 12, termed a spoiler ring, is mounted concentric with the axis of the dynamic pressure opening 7 and supported from the threaded portions 10 of the arms 9 by means of supporting lugs 13, the ring 12 being secured in a selected position axially with respect to the dynamic pressure opening 7 of the Pitot-static head by means of nuts 14. As seen in Fig. 1, the cross sections of the annular ring 12 are in the form of a thin airfoil section—that is, a section in which the maximum thickness is small as compared to the chord length and in which the cambered side forms the contour of the inner surface of the ring 12.

*Operation*

When the device of Figs. 1 and 2 is mounted on an aircraft during flight, at all normal angles of attack the flow of air through the ring 12 will be smooth and the velocity along an axis coincident with the axis of the dynamic pressure opening 7 will not be materially influenced by the presence of the spoiler ring 12; but if the aircraft should change its angle of attack such that the main supporting surface, such as the wing, approaches the stalling angle, the flow through the ring 12 will become turbulent due to the fact that the airfoil sections of the upper and lower portions of the spoiler ring will have passed through a corresponding stalling angle prior to the stalling of the wing of the aircraft, and once portions of the spoiler ring have reached the stalling angle, the flow through the ring will become highly turbulent, creating large pressure fluctuations adjacent the dynamic pressure opening 7 of the Pitot-static head, which pressure fluctuation will cause a violent oscillation of the pointer 3 of the air-speed indicator, which will serve as a warning of an impending stall to the pilot. When the aircraft returns to a safe flying angle of attack, the flow through the spoiler ring 12 will again be smooth and the air-speed indicating unit 1 will resume its normal function of indicating the air speed of the aircraft.

By virtue of the circular shape of the spoiler ring 12, any side slip or skid of the aircraft beyond a predetermined velocity will also change the angle of the relative wind with respect to the axis of the spoiler ring 12, so that portions of the ring will have passed the stalling angle for the particular airfoil sections employed in the ring, and again turbulent pressure fluctuations at the dynamic pressure opening 7 will appear, causing oscillation of the pointer and indicating the presence of a dangerous side slip or skid.

Fig. 3 illustrates a modified arrangement of the device of Figs. 1 and 2 in that only a half ring, indicated as 12', is employed and is supported by means of a hollow arm 9' from the Pitot-static head 6. The result of air flow over the partial ring 12' is the same as in the device of Fig. 1, in that sections at the bottom of the spoiler ring 12' will stall due to change in the angle of attack of the main aircraft supporting surface, at an angle less than the stalling angle of the main supporting surfaces of the aircraft and, similarly, portions of the spoiler ring 12' which extend vertically will stall due to side slips or skids. In either case a pressure fluctuation will exist at the dynamic pressure opening 7, which is utilized to oscillate the air-speed indicator pointer 3 to give a warning signal in the same manner as in the device of Fig. 1. The shape of cross sections of the pressure spoiler ring 12' of the device of Figs. 3 and 4 is the same as that of ring 12, Fig. 1, and is illustrated in Fig. 5. In order to prevent icing, the ring 12' may be constructed so as to have a hollow interior, in which space an electric heater element 15 is positioned and adapted to be connected by means of conductors 16 passing through the hollow supporting arm 9' to a suitable source of electric current to heat the spoiler ring and prevent the accumulation of ice thereon. This provision of an electrically heated deicing means may, of course, similarly be applied to the device of Fig. 1.

In place of the use of a spoiler ring, it is also possible to employ a streamline body such as indicated at 18 in Fig. 6, which body may be arranged with its longitudinal axis concentric with the axis of the dynamic pressure opening 7 of the Pitot-static head 6. The streamline body 18 must be of such a fineness ratio—that is, ratio of overall length to maximum diameter—that the air flow therefrom will become turbulent at angles of attack in a vertical plane less than the stalling angle of the main aircraft supporting surface or surfaces, and also this angle must be such that the air flow will also be turbulent due to a side slip or skid exceeding a predetermined safe velocity. The turbulent flow produced by the streamline body 18 is utilized for giving a warning indication in the same manner as in the device of Fig. 1.

In applying the devices of Figs. 1, 3, or 6 to an aircraft, it is, of course, necessary to take into consideration the stalling speed of the particular aircraft on which installation is to be made, and the airfoil section of the spoiler devices 12 and 12', or the fineness ratio of the streamline body 18 in Fig. 6, determined accordingly. However, with the device of Fig. 1, the axial adjustment of the spoiler ring 12 relative to the dynamic pressure opening 7 of the Pitot-static head 6 will serve to give the necessary adjustment over a wide range, or since by moving the ring 12 forward the stalling angle of the airfoil sections of the spoiler ring must be increased before the turbulent flow can appreciably affect the dynamic pressure at the opening 7; also the adjustment feature of the device of Fig. 1 provides a means for compensating for any effect the spoiler ring might have on the normal air-speed indication. It is, of course, to be understood that the ring 12' of the device of Fig. 3 and the streamline body 18 of the device of Fig. 6 may also be made adjustable along the axis of the Pitot-static heads to which they are applied.

It is to be understood that while the invention has been illustrated and described as being applied to an air-speed indicator employing a Pitot-static head, the principles of the invention are equally applicable to air-speed indicators employing a Venturi tube as a means for generating a pressure indicative of air speed.

While preferred forms of the invention have been illustrated and described, it will be apparent to those skilled in the art that many variations may be made therein falling within the scope of the invention as defined in the appended claims.

I claim:

1. A stall warning device for aircraft, comprising a Pitot-static head exposed to the air stream, a differential-pressure-responsive indicator connected to said head to indicate air speed, a spoiler device situated in the line of air flow into the dynamic pressure opening of said Pitot-static head, and said spoiler device comprising an annular ring having any longitudinal cross section therethrough in the form of a thin airfoil section with the upper camber thereof forming the boundary of the inner surface of the ring, said ring being mounted concentric with respect to the axis of the dynamic pressure opening of said Pitot-static head and being positioned forward of said opening, and said spoiler device permitting a smooth air flow into said dynamic pressure opening at angles of inclination with respect to the relative air stream below a predetermined value, but creating a turbulent flow at angles of the relative air stream above said predetermined angle, whereby the turbulent flow causes a corresponding fluctuation in the indication of said pressure-responsive indicator to thereby give a warning signal.

2. A stall warning device for aircraft, comprising a Pitot-static head exposed to the air stream, a differential-pressure-responsive indicator connected to said head to indicate air speed, a spoiler device situated ahead of and in the line of flow into the dynamic pressure opening of said head, the spoiler being formed so that longitudinal sections therethrough are in the form of a thin airfoil section, portions of said device being adapted to stall and create a disturbed air flow upon inclination thereof in the vertical plane beyond a predetermined value with respect to the relative air stream, and other portions of said spoiler device being adapted to stall and create a disturbed air flow upon transverse inclination of said spoiler with respect to the relative air stream, the disturbed air flow created by said spoiler device causing large pressure variations at the dynamic pressure opening of the Pitot-static head causing a corresponding fluctuation in the indications of said indicator to thereby give a warning signal.

3. A stall warning device for aircraft, comprising a Pitot-static head exposed to the air stream, a differential-pressure-responsive indicator connected to said head to indicate air speed, a spoiler device in the form of a small streamlined body having a fineness ratio such that inclination of said body with respect to a relatively moving air stream beyond a predetermined angle will cause a disturbed air flow thereover, said streamlined body being positioned with its longitudinal axis coincident with the axis of dynamic pressure opening of said Pitot-static head and said body being positioned ahead of said opening an amount such that smooth flow thereover will not affect the formal function of said air speed indicator, the disturbed air flow created by said spoiler device causing large pressure variations at the dynamic pressure opening of the Pitot-static head, causing a corresponding fluctuation in the indications of said indicator to thereby give a warning signal.

4. The combination with an air-speed indicator of the type employing a Pitot-static head and pressure-responsive indicating means associated therewith, of an element positioned coaxial with the axis of the dynamic pressure opening of said Pitot-static head and forward of said opening, said element having an aerodynamic section such that air flow thereover will be stable for all angles of pitch and yaw with respect to the relative moving air stream less than respective predetermined angles of pitch and yaw, and for angles in excess of said predetermined angles the air flow thereover will be turbulent to an extent to cause material pressure fluctuations at the dynamic pressure opening of said Pitot-static head, which pressure fluctuations may be observed as a warning indication on said pressure-responsive indicating means.

5. A stall warning device for aircraft, comprising—in combination with an air-speed indicator of the differential-pressure-responsive type and having a pressure-generating means exposed to the relatively moving air steam—air-flow-controlling means mounted forward of said pressure-generating means and positioned in the direct line of air flow to said pressure-generating means, said controlling means being of an aerodynamic shape such that inclination of the aircraft in pitch with respect to the relatively moving air stream will produce no appreciable effect on the air stream flowing over said pressure-generating means until the pitching inclination exceeds an angle slightly less than the stalling angle of the particular aircraft on which the device is installed, the said controlling means then causing a highly disturbed air flow over said pressure-generating means which causes the indications of the air-speed indicator to fluctuate with sufficient magnitude to serve as a warning signal.

6. The structure as claimed in claim 5, in which the air-flow-controlling means is a tubular member having any longitudinal cross section thereof in the form of a thin airfoil section, the longitudinal axis of said tubular member being coincident with the axis of said pressure-generating means.

7. The structure as claimed in claim 5, in which the pressure-generating means is a Pitot-static head having a dynamic pressure opening, and in which said air-flow-controlling means is a tubular member supported from said Pitot-static head concentric with the dynamic pressure opening thereof and adjustably positioned ahead of said opening, and any longitudinal section through the said tubular member being in the form of a thin airfoil section.

CARL J. CRANE.